(12) United States Patent
Overgaard et al.

(10) Patent No.: US 12,379,696 B2
(45) Date of Patent: Aug. 5, 2025

(54) METHOD AND SYSTEM FOR CONTROLLING A FLUID TRANSPORT SYSTEM

(71) Applicant: Grundfos Holding A/S, Bjerringbro (DK)

(72) Inventors: Anders Overgaard, Bjerringbro (DK); Brian Kongsgaard Nielsen, Bjerringbro (DK); Carsten Skovmose Kallesøe, Bjerringbro (DK)

(73) Assignee: Grundfos Holding A/S, Bjerringbro (DK)

( * ) Notice: Subject to any disclaimer, the term of this patent is extended or adjusted under 35 U.S.C. 154(b) by 464 days.

(21) Appl. No.: 17/927,346

(22) PCT Filed: May 21, 2021

(86) PCT No.: PCT/EP2021/063679
§ 371 (c)(1),
(2) Date: Nov. 22, 2022

(87) PCT Pub. No.: WO2021/239624
PCT Pub. Date: Dec. 2, 2021

(65) Prior Publication Data
US 2023/0221682 A1 Jul. 13, 2023

(30) Foreign Application Priority Data
May 25, 2020 (EP) .................................... 20176306

(51) Int. Cl.
*G05B 13/02* (2006.01)
(52) U.S. Cl.
CPC ....... *G05B 13/0265* (2013.01); *G05B 13/024* (2013.01)
(58) Field of Classification Search
CPC .......................... G05B 13/0265; G05B 13/024
(Continued)

(56) References Cited

U.S. PATENT DOCUMENTS

2007/0234781 A1 10/2007 Yamada
2018/0313561 A1* 11/2018 Sinha .................. F16K 37/0075
(Continued)

FOREIGN PATENT DOCUMENTS

EP            2807527 A1   12/2014
WO    WO 2013/112574 A1   8/2013

OTHER PUBLICATIONS

International Search Report and Written Opinion of International Searching Authority for International Patent Application No. PCT/EP2021/063679, mailed Jun. 11, 2021 (16 pages).
(Continued)

*Primary Examiner* — Jigneshkumar C Patel
(74) *Attorney, Agent, or Firm* — ICE MILLER LLP; Justin D. Swindells

(57) ABSTRACT

A method for controlling operation of a fluid transport system by applying a self-learning control process. The method includes: receiving obtained values of input signals during operation of the system during a first period of time, which is controlled by a predetermined control process, automatically selecting a subset of the input signals based on the received obtained values of the input signals, receiving obtained values of at least the selected subset of input signals during a second period of time, which is controlled by applying the self-learning control process, which is configured to control operation based only on the selected subset of input signals, and wherein applying the self-learning control process includes updating the self-learning control process based on the received obtained values of the selected subset of the input signals and based on at least an approximation of a performance indicator function.

22 Claims, 5 Drawing Sheets

(58) Field of Classification Search
USPC .......................................................... 700/28
See application file for complete search history.

(56) References Cited

U.S. PATENT DOCUMENTS

| | | | |
|---|---|---|---|
| 2019/0187631 A1 | 6/2019 | Badgwell | |
| 2020/0005185 A1* | 1/2020 | Kim | G06N 20/00 |
| 2021/0341895 A1* | 11/2021 | Havlena | G05B 19/0425 |

OTHER PUBLICATIONS

Overgaard, A. et al.; "Reinforcement Learning for Mixing Loop Control with Flow Variable Eligibility Trace"; 2019 IEEE Conference on Control Technology and Applications (CCTA), pp. 1043-1048; IEEE; Aug. 19-21, 2019; XP033645585; DOI: 10.1109/CCTA.2019.8920398 (6 pages).

Serale, G. et al.; "Model Predictive Control (MPC) for Enhancing Building and HVAC System Energy Efficiency: Problem Formulation, Applications and Opportunities"; Energies, 2018, 11, 631; Mar. 12, 2018; DOI: 10.3390/en11030631 (35 pages).

Overgaard, A. et al.; "Mixing Loop Control using Reinforcement Learning": Proceedings of the 13th REHVA World Congress CLIMA 2019, 111, 05013, pp. 1-7; retrieved from https://doi.org/10.1051/e3sconf/201911105013 (7 pages).

Overgaard, A et al.; "Input Selection for Return Temperature Estimation in Mixing Loops using Partial Mutual Information with Flow Variable Delay"; 2017 IEEE Conference on Control Technology and Applications (CCTA), Maui, HI, USA, 2017, pp. 1372-1377, doi: 10.1109/CCTA.2017.8062650 (6 pages).

May, R. et al.; "Review of Input Variable Selection Methods for Artificial Neural Networks"; from Artificial Neural Networks—Methodological Advances and Biomedical Applications, Apr. 11, 2011; ISBN 978-953-307-243-2; InTech, available from: http://www.intechopen.com/books/artificialneural-networks-methodological-advances-and-biomedical-applications/review-of-input-variable-selectionmethods-for-artificial-neural networks (27 pages).

* cited by examiner

METHOD AND SYSTEM FOR CONTROLLING A FLUID TRANSPORT SYSTEM

CROSS-REFERENCE TO RELATED APPLICATIONS

This application is a U.S. National Stage of International Application No. PCT/EP2021/063679, filed May 21, 2021, which claims the benefit of and priority to European Patent Application No. 20176306.7, filed May 25, 2020, both of which are incorporated herein by reference in their respective entireties.

TECHNICAL FIELD

The present disclosure relates to a method and system for controlling a fluid transport system, such as a heating system, a water supply system, a wastewater system or the like.

BACKGROUND

In heating systems such as HVAC systems for buildings and district heating networks, operation with lowest possible cost while still offering good comfort for the end users is a problem that has been worked on for decades. But the problem is complicated, and in many existing systems conventional industrial controllers are employed.

Previous attempts have been made to develop control methods that can be used in an ecosystem with more data, see e.g. EP2807527 or Gianluca Serale, Massimo Fiorentini, Alfonso Capozzoli, Daniele Bernardini and Alberto Bemporad, "Model Predictive Control (MPC) for Enhancing Building and HVAC System Energy Efficiency: Problem Formulation, Applications and Opportunities", Energies 2018, 11. These prior art control methods are based on models and, in particular, use a Model Predictive Control (MPC) framework. However, this requires an appropriate model structure for a building or for consumers in a district heating network. Such a model is not easily obtainable due to differences from building to building or from district heating network to district heating network. In particular, such differences may relate to differences in the loads involved, differences in available data points, differences in constructional details etc. Accordingly, each control system may have to be manually configured case by case by an appropriate expert based on a posteriori knowledge of the specific system.

More and more devices, such as IoT devices, have emerged that are connected to a data network such as the internet, whereby an increasing access to the device data points is gained. Hereby a large pool of data points is available for improving the control of HVAC systems and district heating networks, in particular for providing systems that operate with a good comfort for the end users while keeping the operating cost as low as possible. Recently, data-driven, i.e. model free, control methods have been suggested in an attempt to reduce the need for manual case-to-case configuration.

Overgaard, C. S. Kallesøe, J. D. Bendtsen, and B. K. Nielsen, "Mixing Loop Control using Reinforcement Learning," in Proceedings of the 13th REHVA World Congress CLIMA 2019, describes an investigation of the reinforcement learning method known as Q-learning in the context of a mixing loop for control the temperature and pressure in a in hydronic heating systems.

While the above investigation has shown that the proposed method performs better than some commercially available industrial controllers, practical applications of reinforcement learning involve a number of challenges. A reinforcement agent often requires long training times in order to reach a sufficiently high or even acceptable quality of control. Moreover, heating systems can vary considerably from installation to installation. This reduces the applicability of results obtained from generic models to individual installations.

Accordingly, it remains desirable to provide a method for controlling a fluid transport system that partially or complete solves one or more of the above problems and/or that provides other benefits.

SUMMARY

According to one aspect, disclosed herein are embodiments of a computer-implemented method for controlling operation of a fluid transport system, by a applying a self-learning control process, the method comprising:
  receiving obtained values of a plurality of input signals during operation of the fluid transport system during a first period of time, wherein operation of the fluid transport system during the first period of time is controlled by a predetermined control process,
  automatically selecting a subset of the plurality of input signals based on the received obtained values of the plurality of input signals,
  receiving obtained values of at least the selected subset of input signals during operation of the fluid transport system during a second period of time, wherein operation of the fluid transport system during the second period of time is controlled by applying the self-learning control process, wherein the self-learning control process is configured to control operation of the fluid transport system based only on the selected subset of input signals, and wherein applying the self-learning control process comprises updating the self-learning control process based on the received obtained values of the selected subset of the input signals and based on at least an approximation of a performance indicator function.

Accordingly, embodiments of the process disclosed herein control the fluid transport system by applying a self-learning process that is updated during operation, e.g. continuously or intermittently. The updating is based on the input signals and on a performance indicator function or at least on an approximation thereof. As the input signals to the self-learning control process are automatically selected as a subset from a plurality of available input signals, a potentially large number of available input signals can efficiently be managed. By basing the self-learning control process only on the selected subset of input signals, the time required for the updating process to result in desirable values of the performance indicator function, in particular at least near-optimal values of the performance indicator function, may be reduced considerably. The automatic selection of the subset of input signals is based on received values of a plurality of input signals, which have been received while controlling the fluid transport system by a predetermined control process. Accordingly, the process is capable of selecting a subset of input signals having a high relevance for the updating of the self-learning process, thus facilitating fast convergence of the updating process. Moreover, as the subset of input signals is selected from a plurality of input signals that are obtainable during operation of the fluid transport system, embodiments of the process disclosed herein can efficiently be applied to different types of fluid transport systems and provide a high-quality control of a variety of types of fluid transport systems.

Embodiments of the method described herein are data-driven and do not heavily rely on a model of the fluid transport system to be controlled. In particular, the automatic selection of input signals may be data-driven. Moreover, the need for posteriori domain knowledge configuring the control process is considerably reduced, if not eliminated altogether.

Generally, examples of a fluid transport system include a system that utilizes a fluid as a heat-transfer medium, such as a heating and/or cooling system, in particular a heating and/or cooling system for one or more buildings. Examples of a fluid transport system thus include a hydronic system, a heating and/or ventilation and/or air conditioning system—also referred to as an HVAC system. Further examples of a fluid transport system include a district heating system. A district heating system may include a district heating network including a plurality of heating systems for respective buildings. Yet further examples of a fluid transport system include a fluid supply system or a fluid disposal system, e.g. a water supply system or a wastewater system. Examples of fluids transported by the fluid transport system include a liquid, such as water or water-containing liquids, e.g. wastewater or liquids including a major part of water and a minor part of other components. Other examples of fluids include other forms of liquid or gaseous heating or cooling agents. Yet further examples of fluids include air or other gases.

Generally, each control process, i.e. the predetermined control process and the self-learning control process, may control operation of the fluid transport system by controlling one or more controllable control variables of the fluid transport system. Examples of controllable control variables include, a valve setting—in particular a valve opening degree—a temperature set point, a pump pressure set point or a pump speed set point, an opening degree of a damper, a fan speed and/or the like. Generally, each control process, i.e. the predetermined control process and the self-learning control process, may control the fluid transport system, in particular the one or more control variables of the fluid transport system, responsive to one or more input signals. To this end, each control process may implement a respective control strategy that determines how the fluid transport system, in particular how the control variables of the fluid transport system, are to be controlled responsive to the input signals.

The predetermined control process may implement a predetermined control-strategy, e.g. a model-based and/or rule-based control strategy, e.g. a feedforward control, a feedback control, a fixed set point routine and/or another conventional control process. In particular, the predetermined control-process may implement a non-adaptive control strategy, i.e. the control strategy applied by the predetermined control process may be static, i.e. does not change, during the first period. Accordingly, the initial configuration of the self-learning control process and, in particular the selection of input signals, neither requires extensive expert knowledge of the particular fluid transport system to be controlled, nor does it require data about the performance of the fluid transport system when controlled by the self-learning control process to be configured. Instead, the data used for the selection of input signals may be collected while the fluid transport system is controlled by another suitable control process, e.g. a conventional non-adaptive control process. Accordingly, embodiments of the process described herein may be implemented even in new fluid transport systems in a plug-and-play manner. Alternatively or additionally, in some embodiments, the predetermined control process may be a previous self-learning control process, thus facilitating reconfiguration of an earlier self-learning control process, such as periodically or triggered by a user command or other trigger event, e.g. in situations where changes have been made to an existing fluid control system.

A self-learning control process refers to an adaptive control process that is configured to automatically change, i.e. update, the control strategy, e.g. by updating a data-driven estimate of a future reaction, in particular a future performance, of the fluid transport system in response to control actions taken by the self-learning control system. The resulting update of the self-learning control process over time is based on one or more criteria, in particular so as to improve, in particular so as to at least approximately optimize, a performance measure. An example of a performance measure is the so-called return which may be expressed as a weighted sum of performance indicators obtained at respective times. A performance indicator or a combination of multiple performance indicators may also be referred to as a reward.

The performance of the fluid transport system at a given time typically depends on the operational state of the fluid transport system at one or more previous times. Accordingly, control actions taken at a given time for changing the operational state of the fluid transport system influence the future performance of the system. The control actions will also simply be referred to as actions. Examples of actions may include the setting and/or adjustment of one or more control variables of the fluid transport system, e.g. by setting or adjusting a valve setting—in particular a valve opening degree—a temperature set point, a pump pressure set point or a pump speed set point, an opening degree of a damper, a fan speed and/or the like.

As the future performance of the system has not yet been measured at the time a decision about a potential control action is to be made, the self-learning control process may seek to select actions that improve an expected future performance measure. The expected future performance measure is also referred to as a performance indicator function. The performance indicator function may depend on the current operational state and, optionally, on the actions taken. Depending on the type of performance indicator function, the self-learning control process may select actions that seek to either increase or decrease function values of the performance indicator function.

As the self-learning control process may not know the exact form of the performance indicator function, i.e. how the expected future performance of the system depends on the current state and/or current actions, some embodiments of the self-learning process may maintain an estimate or approximation, in particular a parametrized approximation, of a performance indicator function. Said approximation will also be referred to as performance approximator function, as it may represent an approximation of how an estimated future performance measure depends on a current operational state of the fluid transport system and/or on current control actions taken by the self-learning control process.

Examples of a self-learning control process include a control process implementing a reward-based learning agent, such as a reinforcement learning process for adapting the control strategy. Some embodiments of a self-learning control process select control actions to be taken based on one or more selection rules, also referred to as a policy. The one or more selection rules may be indicative of which actions to be taken based on a current state of the fluid transport system, in particular based on the received subset of input signals. Examples of a selection rule include selection rules that select actions that improve the output of the estimated future performance measure. Some examples of a selection rule, e.g. the so-called ε-greedy policy, are explorative selection rules that select actions so as to improve the output of the estimated future performance measure while allowing explorative actions with a certain probability. Explorative actions may include actions that, based on the current performance approximator function, are suboptimal.

Some embodiments of the self-learning control process may update the performance approximator function based on observed performance indicators. The observed performance indicators may be measured values and/or values calculated based on measured parameters, and the observed performance indicators may be indicative of a performance of the fluid transport system. The performance indicators may also be referred to as rewards, as they may represent a reward associated with previous actions taken by the self-learning agent. The resulting update of the self-learning control process over time may thus include an update of the performance approximator function so as to reduce an error measure which may be indicative of a deviation between one or more observed performance indicators and an output of the performance approximator function resulting from one or more previous actions.

Other examples of a self-learning control process include adaptive control and iterative learning. For the purpose of the present description, a self-learning control process will also be referred to as a "learning agent". Embodiments of a self-learning process are capable of learning from its experiences, in particular to adapt the control strategy based on observed input variables and based on one or more observed performance indicators. The self-learning process starts with an initial version of the control strategy and is then able to act and adapt autonomously, through learning, to improve its own performance. A current control strategy may include a current performance approximator function and a selection rule, also referred to as a policy, according to which the self-learning process selects one or more actions given the output of the current performance approximator function. Updating the self-learning process may include updating the current performance indicator function and/or the selection rule based on one or more observed performance indicators.

Generally, each input signal may be indicative of a sensed, determined or otherwise obtained input variable. For example, some input signals may be sensed by, and directly or indirectly received from, a suitable sensor, such as a temperature sensor, a pressure sensor, a flow sensor, etc. Some input signals may be determined by the process from one or more sensed signals and/or from other input data. Some input signals may be received from a component of the fluid transport system. Yet further, some input signals may be received from a remote data processing system, from the internet or from another source. A sensed or otherwise obtained input signal may be indicative of a property of the fluid at a certain location of the fluid transport system, e.g. a fluid temperature, a fluid pressure, a fluid flow rate. Other examples of sensed or otherwise obtained input signals may be indicative of other properties of the fluid transport system, e.g. an operational temperature or a power consumption of a pump or of another functional component of the fluid transport system. Yet further examples of sensed or otherwise obtained input signals may be indicative of a property of an environment of the fluid transport system, e.g. a room temperature, an outside temperate, a wind speed, a wind direction, etc. In some embodiments, one or more of the input signals are received from respective IoT connected devices, such as weather stations, heat meters, etc. Accordingly, the selection of input signals may include the selection of a type of input variable, e.g. a room temperature measured by a temperature sensor, a fluid pressure measured by a pressure sensor or the like.

Each input signal may have associated with it a time at which the input variable was sensed or otherwise obtained, e.g. an absolute time or a relative time, e.g. relative to a current time or another suitable reference time. In some embodiments, the associated time may simply be the time of receipt of the input signal by the process; alternatively or additionally, one or more input signals may have a time stamp associated with it, e.g. indicative of a time of measurement of a sensed input variable or the like. Accordingly, each input signal may be indicative of a type of input variable, a sensed or otherwise obtained value of the input variable, and a time at which the value of the input variable has been sensed or otherwise obtained, e.g. received. In particular, in some embodiments, one or more of the input signals may represent respective time series of sensed or otherwise obtained values of an input variable. Selection of an input signal may include a selection of a type of input variable and further include a selection of a time shift delay, i.e. a selection of a particular relative time at which observed values of the input variable are to be taken into account by the self-learning control process.

The time shift delay may be selected relative to a suitable reference time, such as a current time at which a control decision is made, i.e. the time where the control process determines what control actions to take. For example, selection of an input signal may include selection of a time series of room temperatures measured by a temperature sensor time shifted ½ h, or a time series of fluid pressures measured by a pressure sensor time shifted 2 minutes, or the like. For the purpose of selecting a subset of input signals from the plurality of input signals, an input variable measured at a first time and the same input variable measured at a second time, different from the first time, may thus considered as different input signals.

In many fluid transport systems, the effect of many input variables on the performance of the fluid transport system is associated with a delay, i.e. a change in the input variable does not affect the performance of the fluid transport system instantaneously but rather at a later point in time. The delay may depend on an amount of fluid flow in the fluid transport system. In particular, a high flow rate may cause a change of an input variable to affect the performance of the fluid transport system faster than a low flow rate. In order to better account for such situations, the selection of input signals may be a conditioned selection, e.g. a selection that depends on one or more operational conditions. For example, the selected time shift delay associated with a selected input signal, in particular the selected time shift delay in respect of a time series representing values of an input variable indexed by time, may be selected in dependence of a flow rate of the fluid. Accordingly, the selected time shift delay may be a constant time shift delay or a variable time shift delay, in particular a flow-dependent time shift delay, depending on a variable indicative of a fluid flow rate in the fluid transport system.

The automatic selection preferably results in a selection of a true subset of input signals or in another form of dimensional reduction of the input space defined by the plurality of input signals. Accordingly, in some embodiments, the plurality of input signals defines an input space having a first number of dimensions, wherein the selected subset of input signals defines a reduced input space having a reduced number of dimensions, smaller than the first number of dimensions. The selected subset may include a selection of all or only a subset of input variables. As discussed above, for each input variable that is represented as a time series of values, i.e. as a sequence of values indexed by a time variable, the selection may include a selection of a time-shift delay indicative of when the corresponding observed values of the time series should be used as input signals for the self-learning control process. At any given time step, the self-learning control process may thus not need to evaluate the entire time series but rather only individual values of the time series, namely those at the selected time shift delay. Accordingly, the selection of one or more individual time-shift delays in respect of a time series may also contribute to the reduction of dimensionality of the input space to the self-learning control process, e.g. in addition or alternative to the selection of a subset of input variables.

The automatic selection may be performed based on one or more selection criteria, such as one or more predetermined selection criteria. While the input selection may be based on a model of the system, it is preferable that the input selection is model-free and only driven by the received input signals and, optionally, by a suitable performance measure, in particular by an observed performance measure. Data driven, in particular model-free, selection criteria facilitate application of the process disclosed herein to a variety of different fluid control systems, not all of which may be known a priori. In some embodiments, the selection may apply a non-linear selection process, such as an information-theoretic selection process, thereby providing a more reliable control for a variety of different types of fluid transport systems. An information-theoretic selection process refers to a selection process that applies and information-theoretic selection criterion. The term "information-theoretic selection criterion" refers to a criterion used for selection that is based on information theory, in particular to a criterion based on a measure of entropy and/or of mutual information. A measure based on entropy determines a level of information in an input signal while a measure based on mutual information determines a level of information shared between two or more variables, e.g. between an input signal and an observed performance measure. In some embodiments, the selection is based on a mutual information criterion, in particular on a selection criterion based on mutual information between one or more input signals and an observed performance measure. Here and in the following, the term observed performance measure refers to an output of the performance measure that is determined, in particular calculated, from actually observed data, in particular from the input signals obtained during the first period of time. The performance measure used for the purpose of selection of input signals may be the same performance measure that is sought to be improved by the self-learning control process during the second period. In some embodiments, selection comprises selecting an input variable and an associated time shift delay having a maximum mutual information with the observed performance measure.

The automatic selection of the subset of input signals may be performed during a transition period, subsequent to the first period and prior to the second period. The transition period may be shorter than each of the first and second periods. In particular, the selection of the subset of input signals may be performed after completion of the first period. Upon completion of the selection of the input signals, control of the fluid transport system may be switched from the predetermined control process to the self-learning control process, thereby initiating the second period.

In some embodiments, the method further comprises configuring an initial version of the self-learning control process, in particular configuring the initial version of the self-learning process based on the selected subset of input signals. The initial version of the self-learning control process may thus apply an initial control strategy which is subsequently updated during operation of the self-learning control process. Configuration of the initial version may comprise pre-training the initial version of the self-learning control process based on the obtained values of the plurality of input signals that have been received during the first period of time, and based on performance indicator values recorded during operation of the fluid transport system during the first period of time. The configuration of the initial version may also be performed during the transition period. A pre-trained self-learning control process thus provides a relatively high-quality control from the outset and evolves faster towards an optimized process.

The performance measure defines a quality criterion or other success criterion of the control strategy. The performance measure may depend on one or more variables, such as on a temperature, a humidity, an air flow, an energy consumption, and/or the like. The performance measure may depend on the time of day and/or the time of year and/or on the weekday, etc or may otherwise be time-dependent. Values of the performance measure may be scalar. The performance measure may represent a single performance indicator or a combination (e.g. a weighted sum) of multiple performance indicators. An example of a performance indicator may be an indicator indicative of an operational cost, e.g. a power consumption. In the context of a heating system, examples of cost indicators include indicators based on one or more temperatures measured in the system or any other variable that can be associated to the cost of operating the building or the district heating network. Another example of a performance indicator in the context of a heating system or HVAC system may include an indicator indicative of a comfort level, e.g. a difference of a room temperature from a target temperature, a rate of fluctuation of the room temperature, a variation of the room temperate across a building, a humidity, an air flow, etc. Accordingly, the process allows the control process to take different performance criteria into account.

In some embodiments, the performance indicator function represents an expected future performance measure of the fluid transport system, i.e. function values of the performance indicator function may represent expected future values of the performance measure. The expected future performance measure may be determined in dependence of a current state of the fluid transport system, in particular as represented by the received subset of input signals. The expected future performance measure may further be determined in dependence of a control action determined by the self-learning control process.

In some embodiments, the performance measure depends on a performance indicator evaluated at a plurality of times, optionally implementing a time-dependent weighting of performance indicator values, in particular a time-dependent weighting in dependence of a rate of fluid flow in the fluid transport system. In many fluid transport systems, the significance of an earlier value of a performance indicator for the present performance of the fluid transport system depends on the flow rate. Similarly, the significance of a present value of a performance indicator for an expected future performance of the fluid transport system depends on the flow rate. Accordingly, incorporating a weighting, particularly a flow-dependent weighting, in the updating of the self-learning control process, in particular in the updating of a performance approximator function, facilitates a more accurate compensation for the flow variable transport delays in the fluid transport system. In some embodiments, the weighting includes a time-dependent weighting of how previously observed performance indicators influence the updating of the self-learning control process. To this end, in some embodiments, the self-learning control process implements a multistep method implemented by an eligibility trace. Such embodiments have been found to show good performance. In particular, some embodiments employ a flow-dependent eligibility trace decay. In some embodiments, a volumetric flow rate is used in both the selection of input signals and in the self-learning control process to compensate for flow variable delay between signals.

In some embodiments, the self-learning control process includes at least one stochastic component, thereby facilitating exploration, by the self-learning control process, new variations of control strategies and, consequently, facilitating an improved evolution of the self-learning control process towards an optimized control strategy.

In general, it may not be known how the performance indicators of a fluid transport system depend on the selected input variables and, in particular, how an expected future performance of a fluid transport system depends on the selected input variables and/or on control actions taken by the control process. Accordingly, in some embodiments, the self-learning control process is based on a performance approximator function approximating a dependence of the performance indicator function on the selected subset of input signals and, optionally, on a current control action. In particular, the performance approximator function may be parametrized by a plurality of weight parameters, and updating the self-learning control process may comprise updating one or more of the plurality of weight parameters. Accordingly, over time, the self-learning control process learns how to approximate the dependence of the performance indicator function, i.e. the future expected performance measure on the selected subset of input signals and, optionally, on the control actions taken by the self-learning control process.

During operation of a fluid transport system during the second period, the operational conditions may change, components of the fluid transport system may be replaced, added, removed or otherwise changed. Accordingly, the initially selected subset of input signals may no longer be the best selection of input signals. To better account for such changes, some embodiments of the process perform a renewed selection of input signals. Accordingly, in some embodiments, the method further comprises:

automatically selecting a new subset of the plurality of input signals based on the received obtained values of the plurality of input signals, received during the second period, receiving obtained values of at least the selected new subset of input signals during operation of the fluid transport system during a third period of time, wherein operation of the fluid transport system during the third period of time is controlled by applying a new self-learning control process adapted to the selected new subset of input signals, wherein the new self-learning process is configured to control operation of the fluid transport system based only on the selected new subset of input signals, and wherein applying the new self-learning control process comprises updating the new self-learning control process based on the received obtained values of the selected new subset of the input signals and based on the performance indicator function or at least an approximation thereof.

It is noted that features of the various embodiments of a computer-implemented method described above and in the following may be implemented at least in part in software or firmware and carried out on a data processing system or other processing unit caused by the execution of program code means such as computer-executable instructions. Here and in the following, the term processing unit comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), special purpose electronic circuits, etc., or a combination thereof.

The present disclosure relates to different aspects, including the method described above and in the following, further methods, systems, devices and product means, each yielding one or more of the benefits and advantages described in connection with one or more of the other aspects, and each having one or more embodiments corresponding to the embodiments described in connection with one or more of the other aspects described herein and/or as disclosed in the appended claims.

In particular, another aspect disclosed herein relates to embodiments of a control system for controlling a fluid transport system. Embodiments of the control system are configured to perform the acts of the method described herein. To this end, the control system may include one or more processing units, in particular a control unit and a remote data processing system. The one or more processing units may have stored thereon program code configured, when executed by the one or more processing units, to cause the control system to perform the acts of the method described herein. It will be appreciated that the control process may include multiple processing units, each configured to perform a subset of the acts of the method described herein.

In particular, in some embodiments, the control system comprises a control unit communicatively coupled to one or more controllable components of the fluid transport system; wherein the control unit is configured to receive obtained values of at least the selected subset of input signals during operation of the fluid transport system and to selectively control operation of the fluid transport system by applying the predetermined control process or by applying the self-learning control process. In particular, the control unit may be configured to control operation of the fluid transport system by applying the predetermined control process during the first period and, optionally during the transition period, and to control operation of the fluid transport system by applying the self-learning control process during the second period.

In some embodiments, the control system comprises a data processing system configured to receive the obtained values of a plurality of input signals during operation of the fluid transport system during the first period of time, and to automatically select the subset of the plurality of input signals based on the received obtained values of the plurality of input signals. In some embodiments, the data processing system is a remote data processing system, in particular a cloud service, located remotely from the control unit. In some embodiments the data processing system is further configured to configure an initial version of the self-learning control process based on the selected subset of input signals; wherein configuring the initial version of the self-learning control process comprises training the initial version of the self-learning control process based on the received obtained values of the plurality of input signals during operation of the fluid transport system during the first period of time and based on performance indicator values recorded during operation of the fluid transport system during the first period of time.

According to yet another aspect, disclosed herein are embodiments of a fluid transport system comprising an embodiment of a control system as described herein.

Yet another aspect disclosed herein relates to embodiments of a computer program configured to cause a control system to perform the acts of the computer-implemented method described above and in the following. A computer program may comprise program code means adapted to cause one or more processing units to perform the acts of the computer-implemented method disclosed above and in the following when the program code means are executed on the one or more processing units. The computer program may be stored on a computer-readable storage medium, in particular a non-transient storage medium, or embodied as a data signal. The non-transient storage medium may comprise any suitable circuitry or device for storing data, such as a RAM, a ROM, an EPROM, EEPROM, flash memory, magnetic or optical storage device, such as a CD ROM, a DVD, a hard disk, and/or the like.

BRIEF DESCRIPTION OF THE DRAWINGS

The above and other aspects will be apparent and elucidated from the embodiments described in the following with reference to the drawing in which.

DETAILED DESCRIPTION

In the following, embodiments of aspects disclosed herein will be described in the context of heating systems such as HVAC systems or district heating networks.

In this context, embodiments of the method and system disclosed herein provide a data driven method for self-commissioning and optimal control of a building or a district heating network. Here, the term self-commissioning refers to a system that itself selects which data points from a large pool to use as inputs to the data-driven control method.

Embodiments of the process and system described herein apply a self-learning control process that reduces, if not minimizes, the cost of operation of a building HVAC system or a district heating network, while maintaining good comfort. Contrary to existing solutions, embodiments of the system and method described herein do not require large amount of posterior knowledge for the purpose of configuring the control system.

Additionally, embodiments of the method and system described herein may be applied to new fluid transport systems, where no data log is yet available for configuration.

Figure 1:
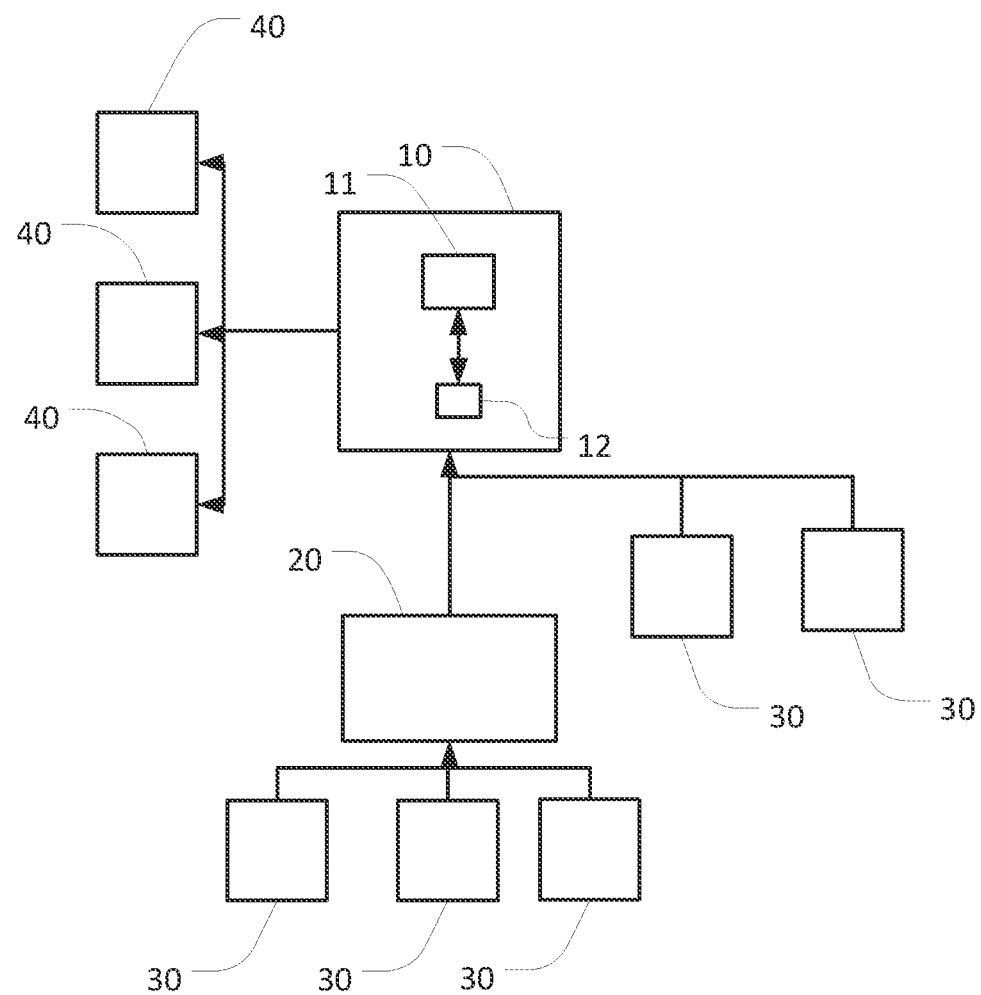
FIG. 1 schematically illustrates an example of a fluid transport system.

FIG. 1 schematically illustrates an embodiment of a fluid transport system, in particular a heating system.

The system comprises one or more controllable components 40, also referred to as actuators. Examples of controllable components of a heating system include valves, pumps and/or dampers. For example, the controllable components 40 may include a valve/pump combination that constitutes a so-called mixing loop. It will be appreciated that some examples of fluid transport systems may include alternative and/or additional types of controllable components, e.g. fans, etc. The system further comprises additional components (not explicitly shown) in addition to the controllable components 40, such as such as pipes, fluid reservoirs, radiators, etc. Some or all of the additional components are directly or indirectly operationally coupled to—e.g. in fluid communication with—the controllable components 40.

The heating system comprises a control system 10 operatively coupled to the controllable components 40 and configured to control one or more controllable variables of the fluid transport system by controlling the controllable components 40. Examples of controllable variables include a valve setting—in particular a valve opening degree—a temperature set point, a pump pressure set point or a pump speed set point, an opening degree of a damper, a fan speed and/or the like.

The control system 10 may be implemented by a suitably programmed data processing system, such as a suitably programmed computer, or by another data processing device or control unit. In some embodiments, the control system 10 may be implemented as a distributed system including more than one computers, data processing devices or control units. The control system 10 is communicatively coupled to the controllable components 40, e.g. via a wired or wireless connection. The communication between the control system and the controllable components may be via a direct connection or via an indirect connection, e.g. via one or more nodes of a communications network.

Examples of a wired connection include a local area network, a serial communications link, a control bus, a direct control line, etc. Examples of wireless connections include a radio frequency communications link, e.g. Wi-Fi, Bluetooth, cellular communication, etc.

The control system 10 comprises a suitably programmed processing unit 11, e.g. a CPU, a microprocessor, etc. The control system further comprises a memory 12 which may have stored thereon a computer program and/or data for use by the processing unit 10. It will be appreciated that the control system 10 may comprise additional components, e.g. one or more communications interfaces and/or a user-interface, e.g. including a graphical user-interface displayed on a display of the data processing system such as on a touch screen. Examples of communications interfaces include a wired or wireless network adaptor, a serial data interface, a Bluetooth transceiver, etc.

The heating system comprises a plurality of sensors 30. Examples of sensors include temperature sensors, pressure sensors, sensors for sensing wind speed, sensors for sensing the operational state of windows, doors etc.

The sensors 30 are communicatively coupled to the control system 10, e.g. via a wired or wireless connection. The communication between the sensors 30 and the control system 10 may be via a direct connection or via an indirect connection, e.g. via one or more nodes of a communications network. Examples of a wired connection include a local area network, a serial communications link, a data bus, a direct data line, etc. Examples of wireless connections include a radio frequency communications link, e.g. Wi-Fi, Bluetooth, cellular communication, etc. In the example of FIG. 1, the control system is directly coupled to some sensors and indirectly coupled to other sensors. The indirect coupling may be via a building management system 20 or other form of data server that receives sensor signals from multiple sensors and/or from other data sources and that forwards some or all of the sensor data to the control system 10. In some embodiments a building management system may implement both a data server and the control system 10.

Generally, examples of input signals include sensor data, e.g. from load-indicating sensors associated with the heating system, e.g. temperatures, pressures, flows etc., or event indicators e.g. such as window or door switches, or other types of sensors.

Additionally or alternatively to the sensor signals from sensors 30, the control system 10 may also receive data or other input signals from other sources. For example, the control system may receive weather forecast data from a weather service, occupancy data from a booking system, information about energy prices from an external system, etc.

Accordingly, during operation, the control system 10 receives sensor inputs from sensors 30 and, optionally, further input from other sources. Generally, the inputs from the sensors 30 and, optionally, from other sources may be received in the form of digital signals or in the form of analogue signals which may then be converted into digital signals. For the purpose of the present description, the received inputs will be referred to as input signals. The control system 10 may receive the input signals intermittently, e.g. periodically, e.g. such that the control system 10 receives one or more time series of sensed values indicative of respective input variables sensed by the sensors at different points in time.

The control system 10 is configured to execute a control process that controls the controllable components 40 responsive to the received input signals or at least responsive to a selected subset of input signals as described herein. In particular, the control system is configured to execute a process as described herein, e.g. one or more of the processes described below with reference to FIGS. 3-6.

Figure 2:
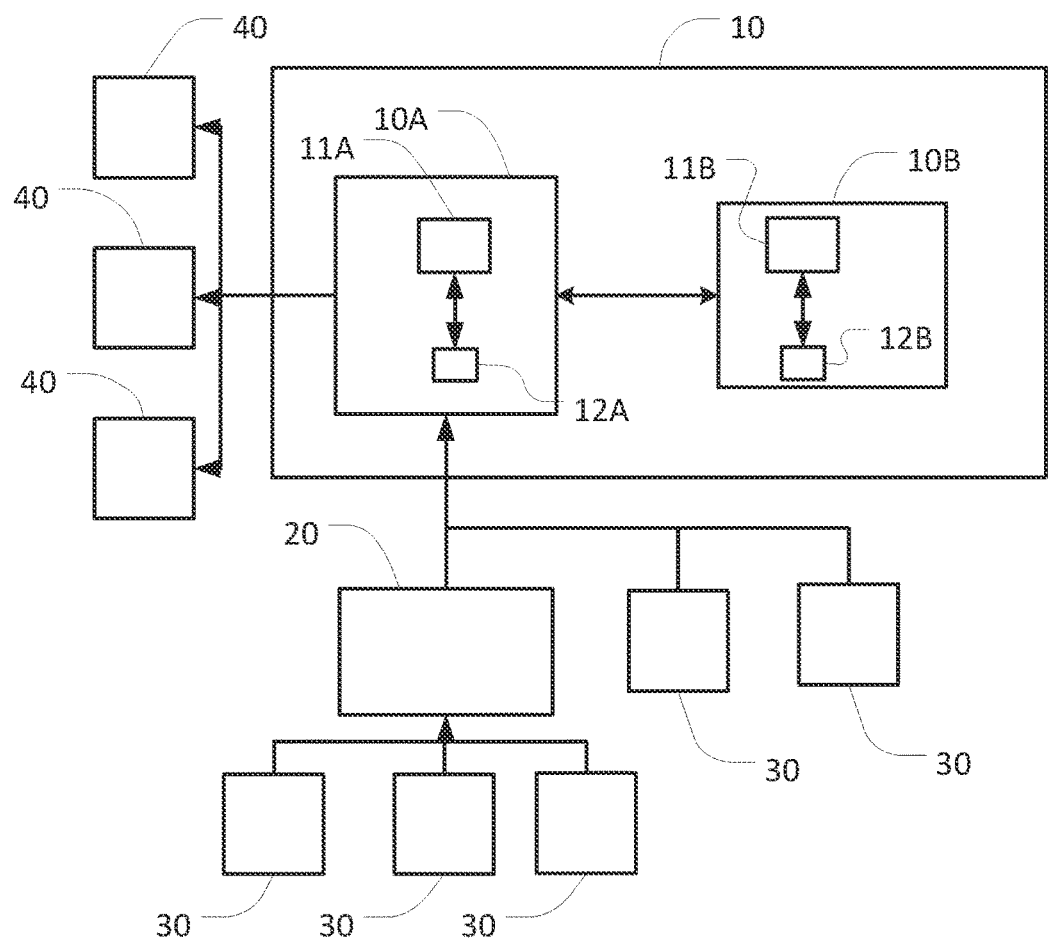
FIG. 2 schematically illustrates another example of a fluid transport system.

FIG. 2 shows another embodiment of a fluid transport system. The system of FIG. 2 is identical to the system of FIG. 1, except that the control system 10 is a distributed system. In particular, the control system includes a local control unit 10A which is communicatively coupled to the controllable components 40 and to the sensors 30. The control system further comprises a remote data processing system 10B, e.g. a remote computer, a distributed computing environment, etc. The local control unit 10A comprises a processing unit 11A and a memory 12A, as described in connection with FIG. 1. The remote data processing system 10B also comprises one or processing units 11B, e.g. one or more CPUs, and at least one memory 12B. The local control unit 10A and the remote data processing system 10B are communicatively coupled with each other, e.g. via a direct or indirect communication link, which may be wired or wireless. For example, the local control unit 10A and the remote data processing system 10B may be communicatively coupled via the internet or another suitable computer network. In some embodiments, the remote data processing system may receive inputs directly from the building management system 20 and/or from sensors 30.

In the embodiment of FIG. 2, the local control unit 10A and the remote data processing system 10B may cooperate to implement an embodiment of the process described herein. For example, the remote data processing system 10B may implement the selection of input signals and/or the configuration and, optionally, pre-training of the self-learning control process, while the local control unit 10A may execute the self-learning control process. Alternatively, the remote data processing system 10B may also execute a part of the self-learning control process, e.g. the determination of actions to be taken and/or the updating of the self-learning control process. In such embodiments, the local control unit 10A may receive information from the remote data processing system about actions to be taken and translate the information in specific control commands to the controllable components 40. The local control unit 10A may further collect the input signals and forward at least the selected input signals to the remote data processing system 10B.

Figure 3:
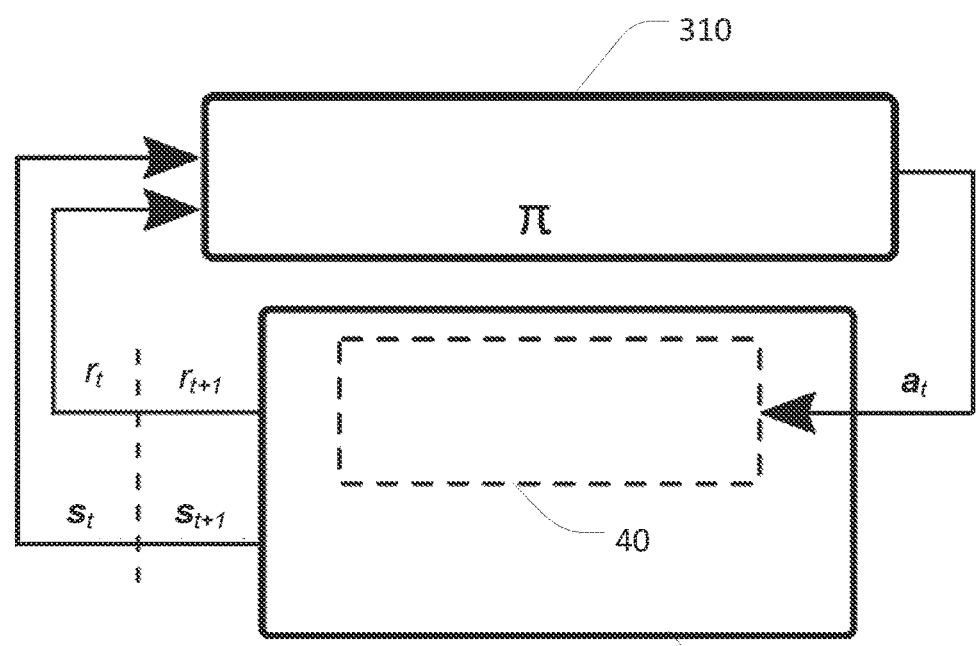
FIG. 3 schematically illustrates a control system for controlling a fluid transport system.

FIG. 3 schematically illustrates a self-learning control process, generally designated 310, for controlling a fluid transport system, in particular a heating system for heating a building. The self-learning control process 310 may be a reinforcement learning control process or other self-learning control process for controlling controllable components 40 of a fluid transport system 60, e.g. of a hydronic system such as an HVAC or a district heating system.

The self-learning control process 310 receives a plurality of input signals, e.g. signals from sensors or from other sources. The input signals may include the controllable control variables through which the self-learning control process can impose control actions. The input signals may further include other signals, e.g. signals that describe the load on the system; these may considered disturbances to the control. The self-learning control process uses a subset of the available input signals as a representation of the state of the fluid transport system. The selected variables may include some or all of the control variables and/or signals describing the disturbances. In the following, the total pool of available input variables will be denoted by x. The values of x at time t is a vector $x_t$. The selected input signals will be referred to as states s. The values of s at time t is a vector denoted by state vector $s_t$. The state vector thus represents the state of the fluid transport system at time t. The process of automatically selecting which subset of input signals to use by the self-learning control process will also be referred to as state selection. The self-learning control process may receive the input signals directly the respective signal sources or from a data server or another suitable data repository where input signals from multiple sources can be stored or otherwise aggregated. The self-learning control process and the data server may be implemented as separate modules or integrated with each other. In particular, they may be implemented by a local control unit, a building management system, or otherwise by the same data processing system, e.g. in a system as illustrated in FIG. 1. Alternatively, the self-learning control process and/or the data server may be implemented by a remote data processing system communicatively coupled to a local control unit, e.g. in a system as illustrated in FIG. 2.

The self-learning control process adjusts one or more control variables for the controllable components. The control variables may be set points for local control loops in the heating system, such as temperature, pressure or flow control loops. For example, in connection with a mixing loop, the control set points may be a temperature and a pump pressure. To this end, the control system executing the self-learning control process 310 has an interface to the controllable components 40 of the heating system, via which the control system imposes actions on the heating system. The adjustments of the control variables by the self-learning control process in response to the received state information are referred to as a set of actions. The set of actions imposed at time t will be designated as a vector $a_t$. The controllable components 40 may for example be valves, pumps or dampers. In one example, the controllable components include a valve/pump combination that constitutes a combination known as a mixing loop. The process determines the actions $a_t$ responsive to the selected subset of received input signals, i.e. responsive to the state $s_t$.

The control process is self-learning, i.e. the control actions for a given state change over time to improve performance, as new knowledge is learned about the result of previous control actions.

To this end, the self-learning control process receives one or more performance indicators indicative of one or more results of the control actions taken by the self-learning control process. The process may base the updating of the self-learning process on a weighted combination of multiple performance indicators and/or another function of one or more performance indicators. The values of a performance indicator at time t will also be referred to as the reward $r_t$. It will be appreciated that the performance indicator may be an overall indicator, e.g. a combination of multiple different performance indicators. Hence, taking actions $a_t$ and bringing the system into a state $s_{t+1}$ yields a reward $r_{t+1}$. The reward may include one or more performance indicators, e.g. a control error and, optionally, an operating cost for the heating system. The reward may be a function of the selected input signals.

Generally, a reinforcement-learning control process may be configured to update itself, i.e. to learn, by reinforcing the desired behaviour by a reward as illustrated in FIG. 3. The self-learning control process 310 seeks to choose an action that optimizes a combination of rewards over time, also referred to as the return G. In particular, the return may be defined as a cumulative n-step reward:

$$G_{t+n} = \Sigma_{k=0}^{n-1} \gamma^k r_{t+k+1}.$$

Here, $0 \leq \gamma \leq 1$ is a discount rate diminishing the influence of future rewards on the return. The added discount rate ensures that the return is well defined going to infinite time, i.e. n->∞, while ensuring a higher importance of rewards happening sooner. In reinforcement learning, the control strategy for the control system is often called a policy $\pi$.

At the time an action is taken, the rewards and, hence, the return resulting from that action cannot yet be measured. The self-learning control process may thus consider an expected future return. An action-value function may be defined that describes the expected return of being in a state $s_t$, taking action $a_t$ and following the policy $\pi$, e.g. as $$Q_\pi(s,a) = E[G_{t+\infty} | s_t = s, a_t = a].$$

Accordingly, the action-value function is an example of a performance indicator function. Other examples of a performance indicator function include a value function describing an expected return of being in a state s and following the policy.

A policy that, given state s, chooses the action a that maximizes the expectation of return is called a greedy policy. A problem associated with the greedy policy is that no new exploration into a potentially more rewarding action is done. The trade-off between exploration and exploitation of current knowledge is an interesting aspect of reinforcement learning since both optimality and adaptiveness are desired. Therefore, stochastic policies where an amount of exploration can be achieved may be used. An example of such a policy is the so-called ε-greedy policy which takes random actions with probability ε.

A self-learning control process seeks to improve the performance of the system by applying a learning process. For example, in U-learning an optimal policy, which maximises the return, is sought to be approximated by finding an optimal action-value function, no matter what policy is followed:

$$Q(s_{t+1}, a_{t+1}) \leftarrow Q(s_{t+1}, a_{t+1}) + \alpha \left[ r_{t+1} + \gamma \max_{a'} Q(s_{t+1}, a_{t+1}) - Q(s, a) \right].$$

Here, $\alpha \in [0;1]$ is the learning rate. While one goal for the learning agent is to approximate the action-value function or other performance indicator function, another goal is for the agent to find the optimal policy that maximises the return for every state. Since the value function and the optimal policy are dependent upon each other, they are often optimized in an iterative fashion called the value-policy iteration.

Generally, the self-learning control process may use an approximation, in particular a function approximation, of the performance indicator function, where the selected subset of input signals and, optionally, the one or more actions are inputs to the function approximation. The approximation will also be referred to as performance approximator function. The performance approximator function may be a parametrized approximation, e.g. in the form of a neural network function approximation or it may have a functional structure derived from domain knowledge. For example, in some embodiments, the control system may maintain an estimate or approximation of the action-value function as performance approximator function, in the following denoted $\hat{Q}(s, a, w)$ where w denotes the weight vector which parametrizes $\hat{Q}$. By taking actions $a_t$ and sampling states $s_t$ and rewards $r_t$, the self-learning control process 310 can improve the estimate of the performance indicator function $\hat{Q}$.

The update of the estimate of the performance indicator function may employ a suitable learning process, e.g. temporal difference learning. Temporal difference learning is another interesting aspect in reinforcement learning. It may be described as a mixture of Monte Carlo and Dynamic Programming. In Monte Carlo the full episode of actions, state transitions and returns are measured and then the estimate of the state-action-value function is computed purely from measurements. In dynamic programming a model of the Markov Decision Process is already known, so an estimate from this knowledge can be used for bootstrapping. In temporal difference learning, the bootstrap target is calculated, both from the sampled reward and the system knowledge already acquired. The temporal difference error is the error between the current estimation of the state-action-value function and the new estimate.

In some embodiments, a multi-step method is employed. Multi-step methods often perform better than single step methods, as they use more samples. To this end, a parametrization using a trace decay λ of returns may be employed such that the method can span from λ=0, corresponding to a one step method, and up to λ=1, corresponding to a Monte Carlo method:

$$G_t^\lambda = (1-\lambda) \sum_{n=1}^{T-t-1} \lambda^{n-1} G_{t+n} + \lambda^{T-t-1} G_{t+\infty}.$$

A multi-step method may preferably be implemented as eligibility traces due to the computational advantages. An eligibility trace utilizes a trace vector z that changes according to the partial derivatives of an estimated performance indicator function with respect to the weights that parametrize the estimated performance indicator function. The trace vector decays by $\gamma\lambda$:

$$z_t = \gamma\lambda z_{t-1} + \nabla_w \hat{Q}(s_t, a_t, w_t).$$

The weights are then adjusted according to $$w_{t+1} = w_t + \alpha \delta_t z_t$$

Where the temporal difference error, $\delta_t$ is the error between the current estimation of the state-action-value function and the new estimate.

In some embodiments, the self-learning control process uses a volume flow rate to schedule the time horizon over which rewards are considered for the purpose of updating the performance approximator function. Multiple horizons are possible for multiple signals. The time horizon may be explicitly defined or implicitly, e.g. by a suitable weighting or decay, such as by a trace decay as described herein.

The subset of input signals used by the self-learning control process are selected from the pool of available input signals. This selection is performed automatically, preferably by a data-driven method, also referred to a state selection method.

The state selection method may be performed before the self-learning control process is used for the first time to control the fluid transport system. To this end, data may initially be collected from the fluid transport system while it is controlled by a standard non-adaptive control process. Moreover, a new state selection may be performed subsequently, e.g. periodically and/or triggered by trigger event. In some embodiments, the state selection runs as often as it is deemed necessary based on domain knowledge, e.g. in order to keep the subset of selected input signals updated, e.g. as described in connection with FIG. 4. Subsequent state selections may be based on data collected during control of the fluid transport system by a current self-learning control process.

Generally, the data-driven state selection may identify the input signals containing the most relevant information for the self-learning control process. Using only a subset of input signals results in a faster learning rate of the self-learning control process. The state selection method may be computationally expensive and may advantageously be performed by a remote data processing system, e.g. by a cloud computing environment, with access to the pool of available input signals x, e.g. as described in connection with FIG. 2. For example, the state selection method applies a mutual information method, e.g. as described in connection with FIG. 6.

Figure 4:
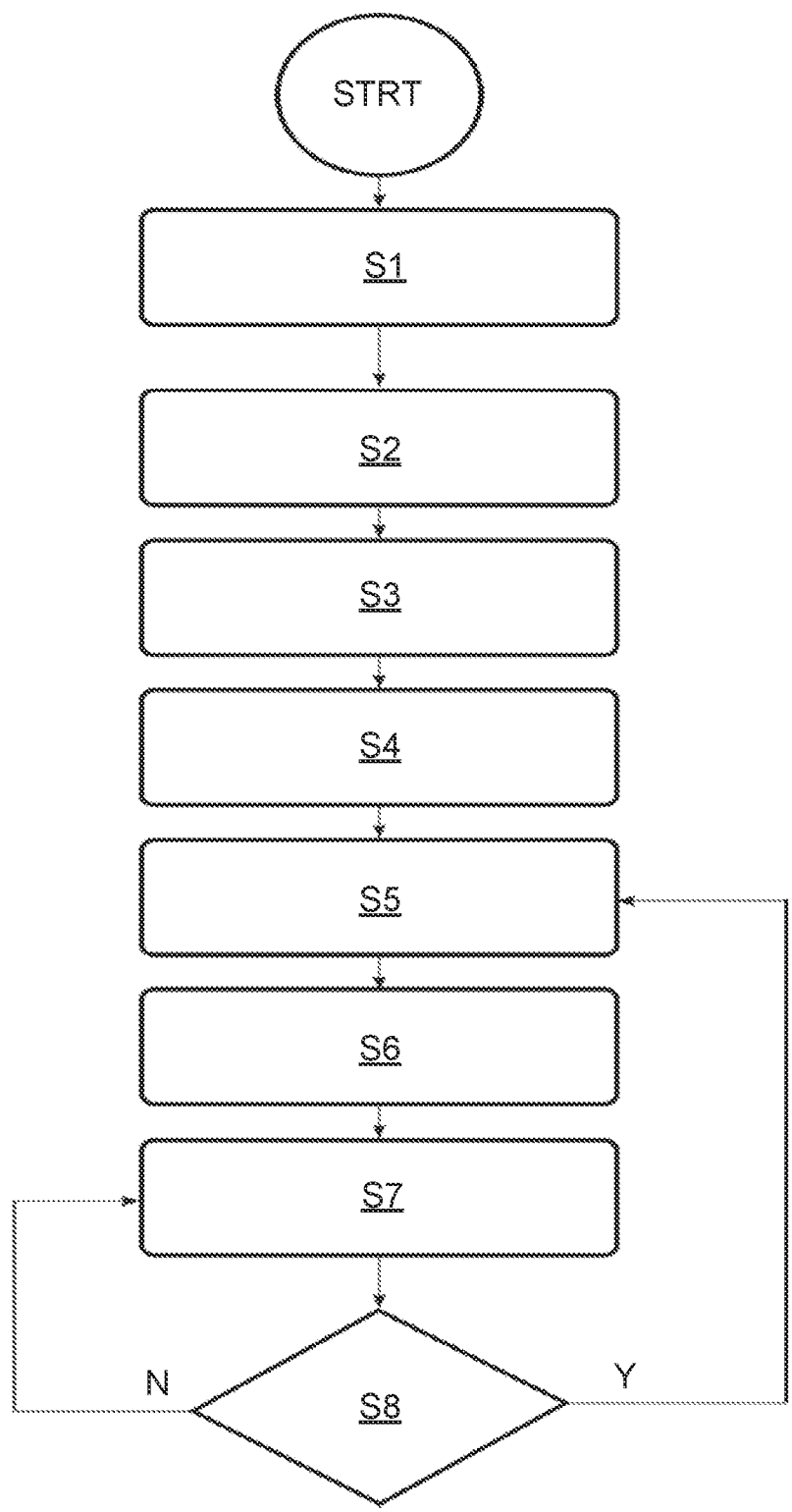
FIG. 4 schematically illustrates a process for controlling a fluid transport system.

FIG. 4 schematically illustrates a process for controlling a fluid transport system.

In initial steps S1 and S2, during a first period of time, the process controls the fluid transport system by applying a predetermined control process, in particular a non-adaptive control process. The predetermined control process may e.g. by implemented as a conventional, commercially available controller, e.g. a PLC, known as such in the art. The process samples and records a plurality of input signals while the fluid transport system is controlled by the predetermined control process. The process further samples and records performance indicators during the first period, the performance indicators being indicative of the performance of the fluid transport system under the control of the predetermined control process. During the data collection, in step S1, training data may be gathered for the state selection. The training data may be collected during a predetermined period of time $t_s$. The training data for the state selection includes a set of input signals $x_s$, the actions $a_s$ taken by the predetermined control process during period $t_s$, and the performance indicators, also referred to as rewards $r_s$, recorded during period $t_s$ Here, the subscript s refers to the state selection.

Additionally, in step S2, further data may be gathered for use as validation data, in particular for defining a stopping criteria. The validation data may be collected during a predetermined period of time $t_v$. The validation data for the state selection includes a set of input signals $x_v$, the actions $a_v$ taken by the predetermined control process during period $t_v$, and the rewards $r_v$ recorded during period $t_v$. Here, the subscript v refers to the validation data.

During step S1 and/or step S2, the process may record flow values q, which may serve as input signals and/or be used for the purpose of performing flow correction.

The duration of the first period of time $t_1 = t_s + t_v$ and the periods $t_s$ and $t_v$ may be predetermined. The choice of a suitable duration may depend on various parameters, such as the complexity of the system to be controlled, the number of input signals, the frequency with which input signals are sampled, etc.

Some embodiments of the process described herein apply a compensation of flow-dependent effects, in particular a flow-dependent selection of input signals and/or a flow-dependent weighting of rewards by the self-learning control process. To this end, in optional step S3, the process selects a constant $\varphi$ for use in the compensation of flow-dependent effects, in particular for calculating a flow variable trace decay. Given the selected constant $\varphi$, the flow variable trace decay $\lambda$ may be calculated as $$\lambda(q_\eta) = \frac{\phi}{q_{\eta(t)}}.$$

where $q_{\eta(t)}$ represents a nomalized fluid flow in the fluid transport system at time t. The constant $\varphi$ may be calculated from a normalized lumped volume $v_\eta$: $\phi = h(v_\eta)$; it may be determined based on domain knowledge about the fluid transport system. For example, the lumped volume coefficient $v_\eta$ may be based on the delay between two variables that results in a maximum mutual information between the variable, or otherwise on a parameters that indicates a general transport delay in the system. In particular, with regard to an HVAC or district heating system, the two variables may be a supply temperature and a return temperature, the latter being a function of the supply temperature at an earlier instant.

In subsequent step S4, when flow compensation is applied for the purpose of state selection, the return $G_t$ or other performance measure is calculated using the decay rate $\lambda$ determined in step S3.

In subsequent step S5, the process selects the subset of input signals for use by a self-learning control process during subsequent control of the fluid transport system by said self-learning control process. This selection process is also referred to as state selection. The state selection preferably uses a mutual information criterion or another suitable selection criterion, e.g. another information-theoretic selection criterion. In particular, the mutual information selection criterion may base the selection on a mutual information between the respective input signals and the calculated return or other suitable performance measure. To this end, the process may apply the flow-compensated return $G_t$ calculated in step S4. An example of a state selection process will be described in greater detail below and with reference to FIG. 6.

In step S6, the process configures an initial version of the self-learning control process, based on the selected input signals. In particular, the process pre-trains the self-learning control process based on the training data collected during steps S1 and/or the data collected during step S2. This pre-training may be performed using the self-learning scheme that is subsequently applied during actual use of the self-learning control process, e.g. as described below with reference to FIG. 5. However, the pre-training is performed "off-policy", since the actions used during pre-training are the ones performed by the predetermined control process rather than by the self-learning control process that is being pre-trained. The pre-training is further based on the, optionally flow-compensated, return $G_t$.

Finally, in step S7, the process controls the fluid transport system using the pre-trained self-learning control process. Control of the fluid transport system by the self-learning control process includes updating the self-learning control process according to a suitable self-learning scheme, e.g. reinforcement learning. An example of this process will be described in more detail below with reference to FIG. 5. Control of the fluid transport system by the self-learning control process may proceed during a second period of time, e.g. until it is stopped. For example, at predetermined intervals and/or triggered by a suitable trigger event, such as by a user command, the process may determine (step S8) whether a renewed state selection should be performed. This determination may be based on the time elapsed since the previous state selection and/or on one or more performance indicators and/or based on user commands. If the process initiates a renewed state selection, the process returns to step S5. The renewed state selection may then be based on data logged during step S7, i.e. during control of the fluid transport system by the current self-learning control process. If the renewed state selection results in a selection of alternative and/or additional input signals, a new self-learning control process may be configured and pre-trained and then replace the current self-learning control process.

Since the state selection is potentially computationally expensive it may be preferable to perform the state selection by a cloud computing environment or other remote data processing system. Moreover, state selection is preferably only run as often as the controlled system has experienced a large change whereby other signals are more feasible to use for the learning agent. A large change might for example be due to a structural change in the controlled system, new sensors or a radical load change.

If the learning agent uses only a few input signals, the self-learning control process may be sufficiently computationally inexpensive for it to be implemented on a local computing device of a heating system, e.g. of an HVAC or district heating system or even by a control unit of a component of the heating system, such as by a smart valve or a centrifugal pump. Nevertheless, in some embodiments, the self-learning control process may be implemented by a cloud computing environment or other remote data processing system.

Generally, during a first period, the process controls the fluid transport system with a predetermined, e.g. conventional, control process, and the process may sample respective time series of the plurality of input signals. In a transition period, the process may select, among the plurality of input signal, a subset of input signals that give the most information compared to the performance measure. Also in the transition period, the process may pre-train a self-learning control process with the selected input signals. In a subsequent second period, the process causes the self-learning control process to operate on live, selected input signals and, in this second period, the self-learning control process controls the fluid transport system and continues to optimize itself, in particular by adapting a parametrised estimate of the performance indicator function.

A specific example of the process of FIG. 4, e.g. when applied to a mixing loop of a heating system, may be summarized as follows:

---

Result: Plug and Play Control Scheme
Initialize: Commercial Controller
Parameters: $m_s \cdot m_v$
repeat
  | Commercial mixing loop control
  | Log input variables $x_s$, actions $a_s$
  | and rewards $r_s$
until Runtime = t: t + $m_s$;
repeat
  | Commercial mixing loop control
  | Log input variables $x_v$, actions $a_v$
  | and rewards $r_v$
until Runtime = t + $m_s$: t + $m_v$;

Determine $v^*$ as $\max_v I(T_{s,t-v/q:T-v/q}; T_{r,t:T})$

Figure 5:
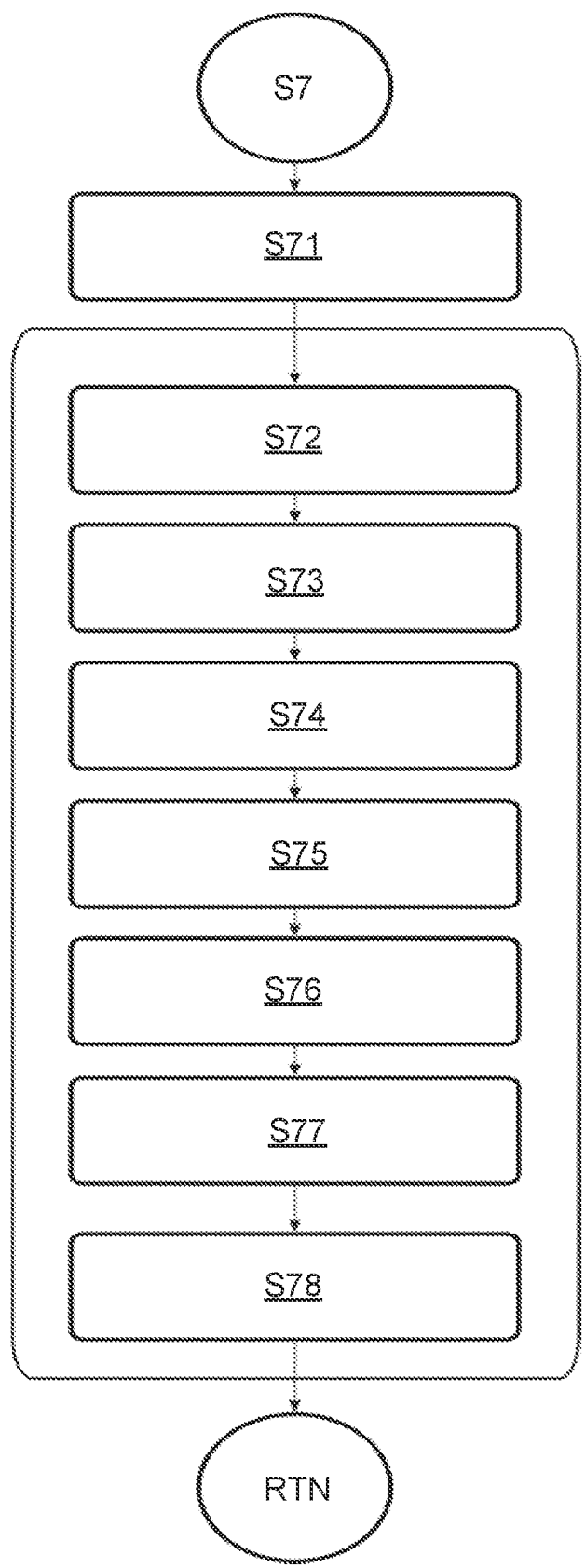
FIG. 5 schematically illustrates a process for controlling a fluid transport system by a self-learning control process.
Figure 6:
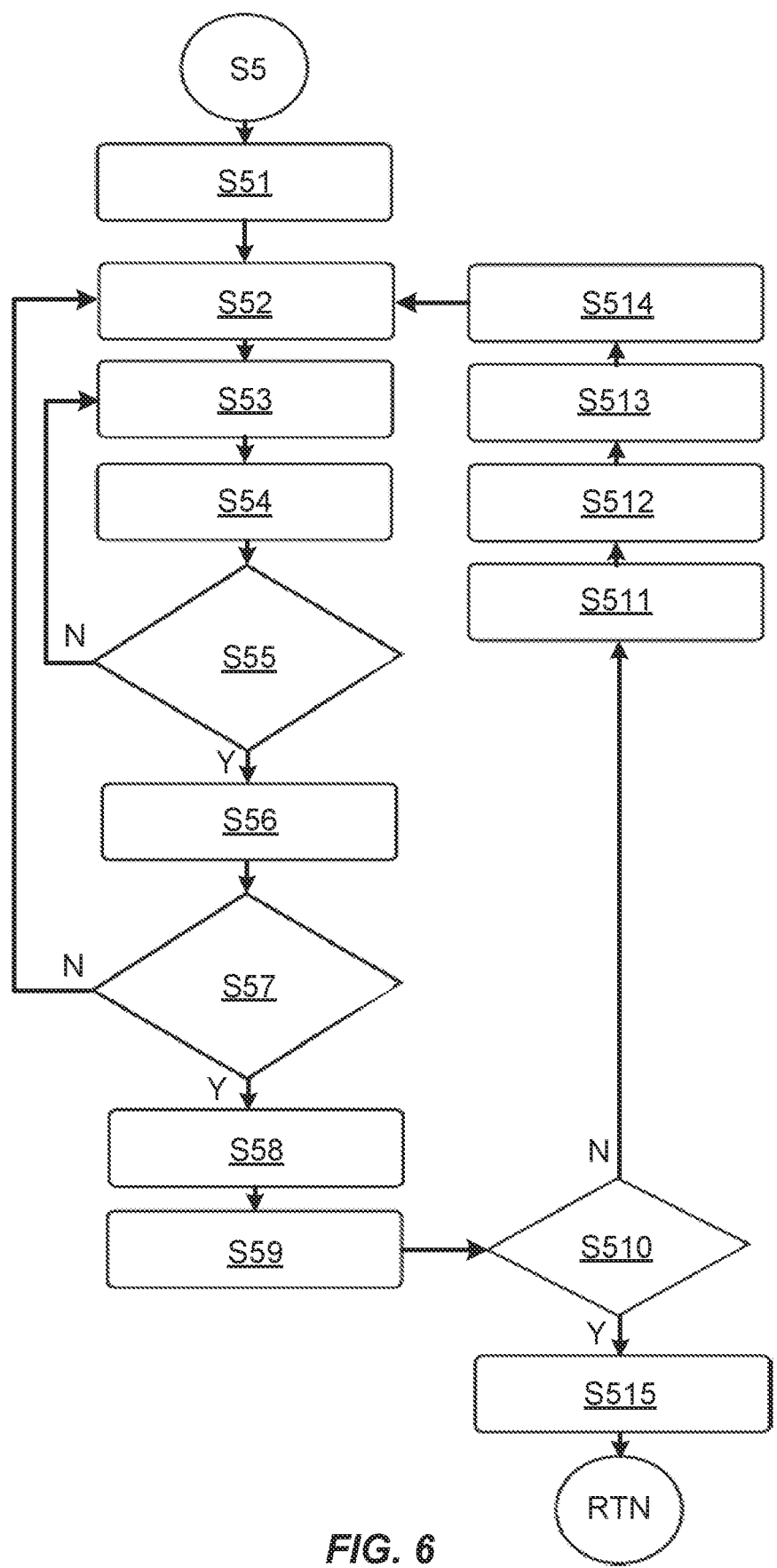
FIG. 6 schematically illustrates a process for selecting input signals for a self-learning control process.

Determine $\phi$ from $v^*$
Use $\phi$ to compute $G_{t:T}^{\lambda(q)}$ from logged data
Do state selection as in FIG. 6
Pretrain RL agent with selected states off-policy
$Q_\phi(0, \lambda)$ using data sets
$[s_{t:t+m_s+m_v}, a_{t:t+m_s+m_v}, G_{t:t+m_s+m_v}^{\lambda(q)}]$
repeat
  | RL $Q_\phi(\sigma, \lambda)$ mixing loop control as in FIG. 5
until Runtime = $\infty$;

---

Here and in the following, when the notation 'is used, it refers to the causality between values of the same parameter. An example is s being a state vector at some iteration/step and s' being the state vector in the following iteration/step.

FIG. 5 schematically illustrates a process for controlling a fluid transport system by a self-learning control process. In an initialization step S71, the process loads initial weights w, in particular the weights resulting from pre-training the model. If no pre-training had been performed, or for the purpose of pre-training, the weights may be initialized in another suitable manner, e.g. to random values or to zero. The process further loads an initial trace vector z, which may also result from the pre-training. The process further observes the current state $s_t$ of the fluid transport system, e.g. receives current values of the subset of input signals selected during state selection. State vector s may describe the state of a controlled system adhering to the Markov property. When sufficient input signals have been observed, e.g. considering delayed input signals as determined during state selection, the process computes an action a according the current control policy. The action vector a describes what action the learning agent controls the system with, i.e. which control variables to modify and how.

The fluid transport system can be moved to a different state by the action. Being in a state yields a reward r. The self-learning control process seeks to maximize a weighted sum of rewards over a time horizon. The weighted sum is called the return $G_r$. The learning agent holds a state-action-value function. The state-action-value function describes how well the system is expected to perform in relation to the return given a state, action and a control policy. The state-action values are approximated via a performance approximator function of the form $\hat{Q}=\hat{Q}(s, a, w)$, such as e.g. a neural network. Here, $\hat{Q}$ is the performance approximator function value approximating the state-action value Q for a given state s and action a. The performance approximator function depends on a set of weights w, e.g. according to $$\hat{Q}(s, a, w) = \sum_{i=1}^{d} w_i b_i(s, a)$$

where $b_i$ is a suitable basis function such as the radial basis function.

The performance approximator function is continuously improved over time to better match the system. This is done by the learning agent by measuring states and rewards while taking different actions and updating the weights according to a suitable backup function. The backup function utilizes the temporal difference error ($\delta$) which describes the difference between the current knowledge of the state action-value space and newly acquired knowledge that forms a target that the function should be moved towards.

To ensure exploration and to facilitate updating the state-action-value function with new information, the agent may take explorative actions that, by current knowledge of the agent, are suboptimal. How much exploration that the agent does versus exploiting the current knowledge to optimize the system is determined by a control policy.

The trace vector z with a decay rate of $\lambda$ is used to determine how fast the influence of historic rewards onto the return decays. For a higher $\lambda$ it follows that the influence of the trace of rewards decays faster.

In particular, once initialized, the process enters a control and updating loop, which is repeated until the process is terminated. In particular, in step S72, the process observes the reward $r_t$ and states $s_{t+1}$ resulting from the previous action taken.

In step S73, the process computes action $a_{t+1}$ according to a selected control policy, e.g. based on an $\varepsilon$-greedy policy.

In step S74, the process calculates the basis vector $b_{t+1}$ from the observed states $s_{t+1}$ and the chosen action $a_{t+1}$ via a basis function, e.g. a radial basis function.

In step S75, the process calculates the temporal difference error $\delta$.

The selection of temporal difference error may differ from pre-training (which is off policy) and online training (which is on policy).

For example, during on-policy training, the temporal difference error may be selected as $$\delta_t^{S} = r_{t+1} + \delta Q(s_{t+1}, a_{t+1}) - Q(s_t, a_t).$$

In off-policy methods, the behavior policy being used by the agent is different from the target policy being learned. For example, Q-learning is off policy since the target policy is the optimal policy as seen by the bootstrapping using the maximizing action $$\delta_t^Q = r_{t+1} + \gamma \max_a Q(s_{t+1}, a) - Q(s_t, a_t).$$

During pre-training, i.e. in step S3 of the process of FIG. 4, data obtained during a first period, where a predetermined control process is used to control the fluid transport system, is used for an initial training of the self-learning control process before the self-learning control process takes over control, i.e. the pre-training occurs in a transitional period before the second period. Accordingly, the pre-training is off policy. To achieve knowledge sharing, a temporal difference error may be based on a parametrization, which provides a way of shifting between on policy and off policy.

$$\delta_t^\sigma = \sigma \delta_t^s + (1-\sigma)\delta_t^Q.$$

By setting $\sigma=0$ and letting the reinforcement learning algorithm train on data logged in the first period, a transfer of knowledge can be achieved.

In step S76, the process observes the flow q and calculates $q_n$ normalized by $q_{max}$. From this, the process calculates the flow variable trace decay $\lambda$ and then updates the trace vector z. In particular, to implement the reinforcement learning as a multistep method, a dutch trace may be used. The flow dependent trace decay changes the horizon of when actions impact the reward. Some embodiments apply a trace decay that is proportional to the flow. In this and other embodiments of the present method, a lumped pipe volume approximation is used. This means that only the volume where the impact on the input-output delay is highest is used. The trace decay may, at every sample, be computed as $$\lambda(q_\eta) = \frac{\phi}{q_{\eta(t)}},$$

where $q_{\eta(t)} \in [q_{\eta,min}, 1]$ is the flow normalized by the maximum flow and where $\phi \in [0,1]$ is a constant that may empirically be determined as a function of lumped volume, e.g. in the relation between forward temperature and a return temperature:

$$\phi = h(v_\eta).$$

A normalization with respect to the maximum flow of the system may be done on the flow and the lumped volume $$v_\eta = \frac{v}{q_{max}}, \quad q_{\eta(t)} = \frac{q(t)}{q_{max}}.$$

A description of the lumped volume v is given here in the context of a mixing loop. Considering an example of a system with no terminal units and only pipe connections between supply and return of the mixing loop, the return temperature is a function of the forward temperature acting at different delays due to different pipe routes:

$$T_r(t) = h(T_s, q)$$

where $$T_s = \left[ T_s\left(t - \frac{V_1}{q_1}\right), \ldots, T_s\left(t - \frac{V_N}{q_N}\right) \right]^T$$

$$q = [q_1, \ldots, q_N]^T.$$

The individual flows in the different pipe routes are not always known; For example, in some applications of a mixing loop, only the total flow leaving the mixing loop is known. Therefore, a flow ratio β may be introduced where the sum of flow ratios for p pipe routes is $$\Sigma_{N=1}^{p} \beta_{N} = 1$$

$$q_N(t) = \beta_N q(t).$$

The ratio of flow β may be assumed constant due to only the main flow being known. The terminal units are controlled by regulating valves, which can change how the flow ratios are distributed. Changes to outside temperature might change little in ratios due to affecting all zones, where solar radiation only hitting one side of a building might change the ratios more and make the approximation of the assumption less accurate depending on the specific building. Now $v_N$ may be defined as $$v_N = \frac{V_N}{\beta_N}.$$

Applying this to the above example gives $$T_s = \left[ T_s\!\left(t - \frac{v_1}{q}\right), \ldots, T_s\!\left(t - \frac{v_N}{q}\right) \right]^T.$$

Therefore a minimum flow threshold may be used.

In step S77, the process updates the weights w of the performance approximator function. The process stores the basis vector $b_{t+1}$ and the state-action value Q for the next iteration.

In step S78, the process executes the action $a_{t+1}$ and returns to step S72.

It will be appreciated that different embodiments may use different types of self-learning control processes, e.g. different types of backup functions and/or different types of temporal difference measures.

A specific implementation of the process of FIG. 5, e.g. when applied to a mixing loop, may be summarized as follows:

---

Result: Online $Q_\phi(\sigma, \lambda)$
Initialize: Weights w, trace vector z. Take action a'
  according to ε-greedy $\pi(\cdot|s_0)$. Calculate feature state b = b($s_0$, a') · $Q_{old}$ = 0

Parameters: ε, α, γ, φ, σ
repeat every sample
 | Observe r and s'
 | Choose a' according to ε-greedy π
 | b' ← b (s', a')
 | Q ← $w^T$b
 | $Q_s'$ ← $w^T$b'

| $Q_Q' \leftarrow \max_{a'} \left( w^T b(s', a') \right)$

| $\delta^o \leftarrow \sigma(r + \gamma Q_s' - Q) + (1-\sigma)(r + \gamma Q_Q' - Q)$
 | Observe flow q
 | if $q_{max} \leq q$ then
 | | $q_n \leftarrow 1$
 | else if $q \leq q_{min}$ then
 | | $q_n \leftarrow q_{min}/q_{max}$
 | else
 | | $q_n \leftarrow q/q_{max}$
 | end

| $\lambda \leftarrow \frac{\phi}{q_n}$

| z ← γλz + (1 − αγλ$z^T$b)b
 | w ← w + α($\delta^o$ + Q−$Q_{old}$)z − α(Q − $Q_{old}$)b
 | $Q_{old}$ ← $\sigma Q_s'$ + (1 − σ)$Q_Q'$
 | b ← b'
 | Take action a'
until Mixing Loop Stop;

---

Interesting aspects of the embodiments described herein include the approximation of the state-action space by a performance approximator function. To ensure stability, methods are preferred that guarantee convergence, e.g. by employing performance approximator functions that are linear in the weights. Multistep methods implemented by eligibility trace have shown good performance.

The above and other embodiments employ a flow dependent eligibility trace decay. To compensate for the flow variable transport delays of the fluid transport system a flow variable trace decay is used. With this compensation lower flow leads to a slower decay, which in turn increases the influence of returns at larger delays. A lumped volume parameter is used to determine the decay rate, A. The lumped volume may be found by analyzing correlation between supply and return temperature yielding information about the nature of the delays of the system. An example of how a flow variable eligibility trace may be applied is described in Overgaard, A., Nielsen, B. K., Kallesoe, C. S., & Bendtsen, J. D. (2019). Reinforcement Learning for Mixing Loop Control with Flow Variable Eligibility Trace. In CCTA 2019-3rd IEEE Conference on Control Technology and Applications. https://doi.org/10.1109/CCTA.2019.8920398.

The reward function used in the above embodiment is a weighted sum of user comfort and cost. User comfort may be indicated by one or more variables related to comfort in a building. Examples of indicators of user comfort include an average of temperature and/or humidity errors for the different zones in the building heated by a heating system. The cost may be a measure of the cost of heat power and actuator energy consumption. The reward function may be constructed such that, during setback periods, which may be user-defined, the comfort measurement is removed from the reward function and replaced by a soft boundary at a specified temperature. This soft boundary temperature determines how low the zone temperatures are allowed to go during setback periods. Since the learning agent optimizes the reward over time (the return) it will learn how to perform optimal setback with cost effective reheating depending on the cost structure of the heat source.

FIG. 6 schematically illustrates a process for selecting input signals for a self-learning control process. The selection of input signals, also referred to as state selection, is done such that the dimension of the state space of the learning agent is reduced to improve training speed. Dimension reduction can be done in a multitude of ways such as Principle Component Analysis or Pruning.

For the reinforcement agent or another self-learning control process to be able to learn it needs to be able to predict the future return from the states and actions. This means that the states should hold enough information for the process to be able to make a reasonable prediction of the return. For building heating and cooling via e.g. a mixing loop, this is dependent on the specific building in which the mixing loop is installed. One building may have large windows where an observation of solar radiation gives information of free heat. Another building might be poorly insulated and leaky, where observations of wind speeds has more information. It can be argued that if all available inputs are fed into the Reinforcement Learning agent it would still converge if the needed information is available. However, using input variables that hold no information or even redundant information would decrease the learning rate of the algorithm due to the curse of dimensionality; whereas the dimension of the input set rises linearly, the total volume of the model domain increases exponentially. In the present disclosure, the inventors propose a data driven state selection such that they may be chosen according to the specific building, but without need of expert knowledge about the specific building.

To this end, the problem of automatic state selection is here handled as a prediction problem where the process determines a set of input signals that carry information suitable for predict the future return.

The reinforcement learning method that is applied in the above embodiment uses the action-value function where a prediction of the expected return is done as a function of the state that the system is in and the action that is taken. The actions space includes the controllable variables controllable by the control process. For example, in the context of a mixing loop this includes the pump speed and the forward temperature.

Since these give information towards the prediction of the return, this information may be removed from the prediction target before choosing the input signals.

The present embodiment and other embodiments described herein employ variable selection via mutual information. Interesting features of this method include the ability to handle nonlinear correlations, being model free and being a filter method in the sense that whole inputs are removed via a filter. Further details of mutual information may be found in Overgaard, C. S. Kallesoe, J. D. Bendtsen, and B. K. Nielsen, *"Input selection for return temperature estimation in mixing loops using partial mutual information with flow variable delay,"* in 1st Annual IEEE Conference on Control Technology and Applications, CCTA 2017, vol. 2017-January, 2017, pp. 1372-1377. The above article describes application of a mutual information to the estimation of a return temperature of a heating system. Embodiments of the methods described in the present disclosure apply the mutual information criteria to the selection of input signals of a self-learning control process for controlling a fluid transport system. In particular, in some embodiments of the method disclosed herein, mutual information is applied to determine whether an input signal has information about a future return or other suitable performance measure.

The process may be performed in an iterative manner: After having found the first input signal containing highest mutual information of the return, a second input signal is sought that gives highest mutual information after the first input signal is already given. The information already given by the first input signal is removed by making an estimation of the return using only the chosen input signal and then subtracting the estimate from the return. To this end, an estimation may be made using a function approximator based on the observed states and performance measure. An example of such function approximator includes a neural network $[f(s_{t:t+k},w) \cong G_{t:t+k}]$ where the weights w are tuned to minimize the absolute error between the predictor output and the observed performance measure $$\min_{w}|G_{t:t+k} - f(s_{t:t+k}, w)|.$$

Likewise, an estimate of the input signals using only the chosen input is also made and subtracted from the remaining input signals, thus leaving a set of residuals.

Specifically referring to FIG. 6, in step S51, the process loads a training data set and a validation data set, in particular the training and validation data sets collected in steps S1 and S2, respectively, of FIG. 4. Each data set contains a complete set of input signals x for the system. One of the input signals is also a volume flow variable $q_t$ and a return $G_t$. The return can be calculated via rewards that describe how well the system is controlled.

In step S52, the process chooses an input signal $x^i$ to analyse from the set of input signals x. A loop runs through all input signals in the set.

In steps S53 through S55, the process calculates mutual information of an input signal.

In particular, in step S53, the process determines a volume constant v for every state that gives a time offsetting as:

$$t_{o,t} = \frac{v}{q_t}$$

such that the time offset maximizes the mutual information with regards to the return. The improvement from using flow dependent time shift delays is due to transport delays in the system. Minimum offset would typically be zero (given by volume constant $v_{min}=0$) for signals without transport delay. The mutual information value is maximized over the volume constant interval ($v_{min}$ to $v_{max}$) for a given signal.

In step S54, the process computes mutual information I between the offset signal vector $x^i$ and the return $G_t$ in the training data set.

Mutual information between two variables may be defined as $$I(\mathfrak{J}; R) = \int\int p(\mathfrak{J}, R)\log\left(\frac{p(\mathfrak{J})p(R)}{p(\mathfrak{J}, R)}\right)d\mathfrak{J}dR$$

The process may compute an approximation of the mutual information. In particular, a discrete approximation of the mutual information may be calculated that is based on estimates of the marginal and joint probability density functions of the input signal and return, using a number m of samples of the input signals and the return, respectively.

In step S55, the process checks whether the v between $v_{min}$ and $v_{max}$, which yields the highest mutual information, has been found. If so, the process proceeds at step S56; otherwise the process returns to step S53.

In step S56, the process updates a sorted index vector to keep track of how much mutual information the selected input signal contains compared to other already investigated input signals. In particular, the process stores the i'th index in a vector sorted according to maximum mutual information.

In step S57, the process determines whether all input signals have been analyzed. If so, the process proceeds at step S58; otherwise the process returns to step S52, i.e. steps S52 to S57 are repeated until a signal index vector has been sorted according to mutual information level of the signals with the corresponding volume constant v for all signals.

In step S58, the process adds the signal with now highest mutual information s to a signal vectors.

In step S59, the process computes an estimate of the return $G_t$ using the signals in s from the validation dataset.

In step S510, the process checks if a stopping criterion is fulfilled. If not, the process proceeds at step S511 and calculates a new training data set, which does not contain the information from the added signal. This calculation is performed in steps S511 to S514 and it is followed by a repetition of steps S52 to S57 until a sorted index vector for the new data set is obtained.

The present method uses a partial mutual information in an iterative manner, namely by choosing the input variable with most information, then removing that information from the prediction target, thus leaving a new residual prediction target. Then the input giving most information about the residual prediction target is found and so forth until stopped or all input variables are sorted.

To this end, the process may compare mutual information of the respective input variables at respective time shift delays, in particular at time shift delays resulting in a highest mutual information for the respective variables.

In particular, in step S511, the process generates an estimated return $G_t$ based on s and generate an estimated state vector $\hat{x}_t$ based on s.

In step S512, the process calculates a new state vector by subtracting the estimated state vector from the new state vector: $x_{t,j+1} = x_{t,j} - \hat{x}_{t,j}$.

In step S513, the process calculates a new return by subtracting the estimated return from the previous return: $G_{t,j+1} = G_{t,j} - \hat{G}_{t,j}$.

In step S514, the process sets $G_t = G_{t,j+1}$ and $x_t = x_{t,j+1}$ as new training set and returns to step S52.

If the stopping criterion of step S510 is fulfilled, the process proceeds at step S55 and selects the state vector as s. Then the state selection process is completed.

An example of a suitable stopping criterion to be applied in step S510 may be based on a white noise comparison, i.e. a determination as to whether the signal with the now highest mutual information adds more to the description of the return than white noise. If this is not the case, the signal does not contain information about the return and the state selection can be stopped.

Another possible stopping criterion may be based on an RMSE (Root Mean Square Error) improvement, i.e. on a determination as to whether the RMSE of the estimation of the return $G_t$ in the validation data set improves above a certain level when adding the signal with the now highest mutual information. If this is not the case, the process may be terminated.

A specific implementation of the process of FIG. 6, e.g. when applied to a mixing loop, may be summarized as follows:

---

Result: State Selection
Initialize: Load training data of all inputs $x_{t:t+m_s}$, return $G_{t:t+m_s}^{\lambda(q)}$ and flow $q_{t:t+m_s}$. Load validation data of n inputs$_{t:t+m_v}$, return $G_{t:t+m_v}^{\lambda(q)}$ and flow $q_{t:t+m_v}$.
Parameters: tol
repeat
    |     Find input with highest mutual information as
    |     $s_{s,t:m_s} \leftarrow \max_{j,v} I(x_{t-v/q:t+m_s-v/q}^j; G_{t:t+m_s}^{\lambda(q)})$
    |     Add s to set of selected inputs s
    |     Generate estimators $\mathbb{E}[G_{t:t+m_s}^{\lambda(q)} | s_{t:t+m_s}]$
    |     and $\mathbb{E}[x_{t:t+m_s} | s_{t:t+m_s}]$
    |     Calculate residuals as
    |     $G_{t:t+m_s}^{\lambda(q)} \leftarrow G_{t:t+m_s}^{\lambda(q)} - \mathbb{E}[G_{t:t+m_s}^{\lambda(q)} | s_{t:m_s}]$
    |     $x_{t:t+m_s} \leftarrow x_{t:t+m_s} - \hat{\mathbb{E}}[x_{t:t+m_s} | s_{t:m_s}]$ $$\text{RMSE} \leftarrow \sqrt{\frac{\sum_{t=1}^{m_v}(G_{t:t+m_v}^{\lambda(q)} - \mathbb{E}[G_{t:t+m_v}^{\lambda(q)} | s_{t:t+m_v}])^2}{m_v}}$$

$\text{RMSE}_{prev} \leftarrow \text{RMSE}$ until tol $> \dfrac{\text{RMSE}_{prev} - \text{RMSE}}{\text{RMSE}_{prev}}$;

---

While embodiments of the various aspects disclosed herein have mainly been described in the context of heating systems for buildings, it will be appreciated that embodiments of the method and system described herein may also be applied for the control of other types of fluid transport systems.

For example, embodiments of the method and system described herein may also be applied for the control of water supply systems. In the context of water supply systems, examples of suitable input signals may include one or more of the following:

Flow and pressure measured at respective pump stations, including controllable flow and/or pressure and/or flow/pressure that cannot directly be controlled, e.g. at non-controlled pump stations.
    Water levels in respective tanks or other reservoirs.
    Weather forecast data, e.g. regarding precipitation and/or temperature.
    Data from pressure sensors within a network.
    Data from meters that measure water consumption at one or more consumers.

Control variables controllable by the control process may include flow and/or pressure at one or more pump stations of a water supply system.

Similarly, embodiments of the method and system described herein may also be applied for the control of wastewater systems. In the context of wastewater systems, examples of suitable input signals may include one or more of the following:

Flow and pressure measured at respective pump stations, including controllable flow and/or pressure and/or flow/pressure that cannot directly be controlled, e.g. at non-controlled pump stations.
    Water levels in gravity-based wastewater conduits and/or in reservoirs.
    Weather forecast data, e.g. regarding precipitation.
    Data regarding water consumption
    Waste-water production data from sources of wastewater, e.g. from one or more large industrial sources of wastewater.

Control variables controllable by the control process may include flow and/or pressure at one or more pump stations of a wastewater system and/or set points of levels at one or more pump stations.

Embodiments of the method described herein can be implemented by means of hardware comprising several distinct elements, and/or at least in part by means of a suitably programmed microprocessor. In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A computer-implemented method for controlling operation of a fluid transport system, by a applying a self-learning control process, the method comprising steps of:
   receiving obtained values of a plurality of input signals during operation of the fluid transport system during a first period of time, wherein operation of the fluid transport system during the first period of time is controlled by a predetermined control process,
   automatically selecting a subset of the plurality of input signals based on the received obtained values of the plurality of input signals,
   receiving obtained values of at least the selected subset of input signals during operation of the fluid transport system during a second period of time, and
   controlling the fluid transport system during the second period of time by applying the self-learning control process, wherein the self-learning control process is configured to control operation of the fluid transport system based only on the selected subset of input signals, and wherein applying the self-learning control process comprises updating the self-learning control process based on the received obtained values of the selected subset of the input signals and based on at least an approximation of a performance indicator function.

2. A computer-implemented method according to claim 1, wherein the predetermined control process is a non-adaptive control process.

3. A computer-implemented method according to claim 1, wherein the plurality of input signals defines an input space having a first number of dimensions; wherein the selected subset of input signals defines a reduced input space having a reduced number of dimensions, smaller than the first number of dimensions.

4. A computer-implemented method according to claim 1, wherein automatically selecting includes applying one or more information-theoretic selection criteria.

5. A computer-implemented method according to claim 4, wherein the one or more information-theoretic selection criteria include a mutual information criterion based on a determined mutual information measure between respective ones of the plurality of input signals and an observed performance measure.

6. A computer-implemented method according to claim 5, wherein the observed performance measure includes at least one observed performance indicator evaluated at a plurality of times, optionally implementing a time-dependent weighting of performance indicator values or a time-dependent weighting in dependence of a rate of fluid flow in the fluid transport system.

7. A computer-implemented method according to claim 1, wherein the automatically selecting includes selecting at least one input signal that is associated with a time shift delay dependent on a flow rate of fluid flow in the fluid transport system.

8. A computer-implemented method according to claim 1, further comprising configuring an initial version of the self-learning control process based on the selected subset of input signals; wherein configuring the initial version of the self-learning control process comprises pre-training the initial version of the self-learning control process based on the received obtained values of the plurality of input signals during the first period of time and based on performance indicator values recorded during operation of the fluid transport system during the first period of time.

9. A computer-implemented method according to claim 8; wherein the automatic selection and the configuration of the initial version of the self-learning control process are performed during a transitional period, subsequent to the first period and prior to the second period.

10. A computer-implemented method according to claim 1, wherein the self-learning control process implements a reward-based learning agent.

11. A computer-implemented method according to claim 10, wherein the reward-based learning agent is a reinforcement learning agent.

12. A computer-implemented method according or claim 10, wherein updating the self-learning control process is based on one or more observed performance indicators, observed during a time horizon or a flow-dependent time horizon.

13. A computer-implemented method according to claim 1, wherein the self-learning control process includes at least one stochastic component.

14. A computer-implemented method according to claim 1, wherein updating the self-learning control process is based on an approximation of the performance indicator function, wherein said approximation is a performance approximator function approximating a dependence of the performance indicator function on the selected subset of input signals and/or on one or more control actions taken by the self-learning control process to control the fluid transport system.

15. A computer-implemented method according to claim 14, wherein the performance approximator function is parametrized by a plurality of weight parameters, and wherein the updating the self-learning control process comprises updating one or more of the plurality of weight parameters.

16. A computer-implemented method according to claim 1, wherein the performance indicator function includes a comfort indicator and/or a cost indicator.

17. A computer-implemented method according to claim 1, further comprising:
   automatically selecting a new subset of the plurality of input signals based on the received obtained values of the plurality of input signals, received during the second period,
   receiving obtained values of at least the selected new subset of input signals during operation of the fluid transport system during a third period of time, wherein operation of the fluid transport system during the third period of time is controlled by applying a new self-learning control process adapted to the selected new subset of input signals, wherein the new self-learning process is configured to control operation of the fluid transport system based only on the selected new subset of input signals, and wherein applying the new self-learning control process comprises updating the new self-learning control process based on the received obtained values of the selected new subset of the input signals and based on at least the approximation of the performance indicator function.

18. A control system for controlling a fluid transport system; wherein the control system is configured to perform the steps of the computer-implemented method according to claim 1.

19. A control system according to claim 18, comprising a control unit communicatively coupled to one or more controllable components of the fluid transport system; wherein the control unit is configured to receive obtained values of at least the selected subset of input signals during operation of the fluid transport system and to selectively control operation of the fluid transport system by applying the predetermined control process or by applying the self-learning control process.

20. A control system according to claim 18, comprising a data processing system configured to receive the obtained values of a plurality of input signals during operation of the fluid transport system during the first period of time, and to automatically select the subset of the plurality of input signals based on the received obtained values of the plurality of input signals.

21. A control system according to claim 20, wherein the data processing system is a remote data processing system, in particular a cloud service, located remotely from the control unit.

22. A control system according to claim 20, wherein the data processing system is further configured to configure an initial version of the self-learning control process based on the selected subset of input signals; wherein configuring the initial version of the self-learning control process comprises training the initial version of the self-learning control process based on the received obtained values of the plurality of input signals during operation of the fluid transport system during the first period of time and based on performance indicator values recorded during operation of the fluid transport system during the first period of time.

* * * * *